United States Patent [19]

Dorius et al.

[11] Patent Number: 5,438,467
[45] Date of Patent: Aug. 1, 1995

[54] NEGATIVE PRESSURE AIR BEARING DESIGN

[75] Inventors: Lee K. Dorius, San Jose; John M. Harker, Palo Alto; Laurence S. Samuelson, San Jose, all of Calif.

[73] Assignee: International Business Machines Corporation, Armonk, N.Y.

[21] Appl. No.: 967,359

[22] Filed: Oct. 28, 1992

[51] Int. Cl.$^6$ ............................................. G11B 21/20
[52] U.S. Cl. ..................................................... 360/103
[58] Field of Search ........................ 360/103, 102, 122

[56] References Cited

U.S. PATENT DOCUMENTS

| | | | |
|---|---|---|---|
| 3,678,482 | 7/1972 | Billawala | 340/174.1 |
| 3,855,625 | 12/1974 | Garnier et al. | 360/103 |
| 4,212,044 | 7/1980 | Plotto | 360/103 |
| 4,218,715 | 8/1980 | Garnier | 360/103 |
| 4,475,135 | 10/1984 | Warner et al. | 360/103 |
| 4,553,184 | 11/1985 | Ogishima | 360/103 |
| 4,555,739 | 11/1985 | Le Van et al. | 360/103 |
| 4,636,894 | 1/1987 | Mo | 360/103 |
| 4,802,042 | 1/1989 | Strom | 360/103 |
| 4,894,740 | 1/1990 | Chhabra et al. | 360/103 |
| 5,047,884 | 9/1991 | Negishi et al. | 360/122 |
| 5,200,867 | 4/1993 | Albrecht et al. | 360/103 |
| 5,200,868 | 4/1993 | Chapin et al. | 360/103 |
| 5,210,666 | 5/1993 | Chapin et al. | 360/103 |

FOREIGN PATENT DOCUMENTS

| | | | |
|---|---|---|---|
| 5644123 | 4/1981 | Japan | 360/103 |
| 60-32174 | 2/1985 | Japan | 360/103 |
| 61-148684 | 7/1986 | Japan | 360/103 |
| 61-160885 | 7/1986 | Japan | 360/103 |
| 63-291280 | 11/1988 | Japan | 360/103 |
| 253256 | 2/1990 | Japan | 360/103 |
| 2132688 | 5/1990 | Japan | 360/103 |

OTHER PUBLICATIONS

"Tri-Rail Negative Pressure air Bearing Design" by Dorius et al, Research Disclosure, Sep. 1991, No. 329, Kenneth Mason Pub.

*Primary Examiner*—A. J. Heinz
*Assistant Examiner*—David L. Ometz
*Attorney, Agent, or Firm*—Baker, Maxham, Jester & Meador

[57] ABSTRACT

A negative-pressure air bearing slider structure includes a slider surface disposed adjacent to a data storage medium, and a leading edge relative to the motion of the data storage medium. A U-shaped rail with a closed end facing the leading edge and an open end facing the trailing edge is formed on the slider surface. The closed end of the U-shaped rail extends laterally across less than the width of the slider surface. In a first set of embodiments, there is a single U-shaped rail centered between two side rails. In a second set of embodiments, there are two U-shaped rails, each disposed along a respective side of the slider surface.

2 Claims, 12 Drawing Sheets

14.5g NEG. LOAD MAX.

13.8g NEG. LOAD MAX.

0g NEG. LOAD MAX.

FIG. 9C

EMBODIMENT THREE

6g NEG. LOAD MAX.

NEGATIVE PRESSURE AIR BEARING DESIGN

BACKGROUND OF THE INVENTION

1. Field of the Invention

This invention relates generally to computer data storage drives and more specifically to a negative air pressure air bearing slider structure employed in conjunction with data storage drives.

2. Description of the Prior Art

The negative pressure air bearing slider designs of the prior art are generally preferable to conventional flat taper slider configurations. The negative pressure structure enables the utilization of low suspension preloads, yielding decreased stationary frictional forces. These forces are oftentimes referred to as "stictional" forces. Negative pressure structures also offer the potential for improved stop/start performance.

One shortcoming of state-of-the-art negative pressure air bearing designs is that the slider produces large negative loads. An example of such a design is disclosed in the Warner et al. reference, U.S. Pat. No. 4,475,135. These structures achieve a high air bearing stiffness which improves the compliance to the disk, but also increases the impact forces resulting from asperity and third-body contact. Such high-impact forces tend to degrade device reliability. Consequently, a structure offering the ability to optimize the amount of stiffness or negative pressure would be desirable.

Although it is possible to adjust the amount of stiffness on existing slider structures by increasing the depth of the etched relief, this approach has significant drawbacks. Deepening the etched relief increases the fly height sensitivity of the slider structure. Furthermore, the reverse air current flow within the depths of the etched relief will be increased, thereby increasing the slider's propensity to accumulate debris. Therefore, it would be desirable to develop a technique for adjusting the negative pressure of the slider structure which is independent of the etch depth. It would also be desirable to provide an air bearing structure having improved static and dynamic performance over existing structures.

SUMMARY OF THE INVENTION

The air bearing slider of the present invention provides a structure which optimizes the amount of negative pressure provided by the slider structure. This slider is employed in conjunction with a data storage medium which may be engaged in motion relative to the slider. The slider structure includes a leading edge and a trailing edge, the edges being determined with reference to the motion of the data storage medium. The slider also includes a bottom surface which faces the data storage medium. The bottom surface extends between the leading edge and the trailing edge.

The negative pressure contours of the slider are determined by means of a U-shaped rail situated between two outer taper-flat pads on the bottom surface. The amount of negative pressure is controlled by adjusting the length and width of the area enclosed by the U-shaped rail. The two outer taper-flat pads provide roll stiffness. These pads may be extended to the trailing edge of the slider to provide a mounting location for a read/write element. In this manner, the negative pressure contours may be optimized for specific device applications.

A second embodiment of the invention includes an isolated island positioned between the legs of a U-shaped rail. The purpose of the island is to provide means for mounting a read/write element to the slider. Two outer pads are employed for improving the roll stiffness characteristics of the slider. These pads may be offset from the trailing edge toward the leading edge of the slider to eliminate roll sensitivity.

A third embodiment of the invention includes element mounting means in the form of a center rail extending from the U-shaped rail to the trailing edge of the slider structure. Two outer pads are employed, which may be offset from the trailing edge toward the leading edge of the slider to eliminate roll sensitivity.

According to a fourth embodiment of the invention, the U-shaped rail can be situated at a position on the bottom surface between the leading and trailing edges of the slider structure. Centering the U-shaped rail between the lateral edges of the slider provides enhanced pitch angle and fly height design flexibility.

In an alternative embodiment of the slider, two U-shaped rails are spaced laterally on the bottom surface near the slider leading edge.

BRIEF DESCRIPTION OF THE DRAWINGS

The various features, aspects, and advantages of the present invention will become apparent from the following more particular description thereof, presented in conjunction with the following drawings.

DETAILED DESCRIPTION OF THE PREFERRED EMBODIMENTS

THE INDUSTRIAL ENVIRONMENT

Figure 1:
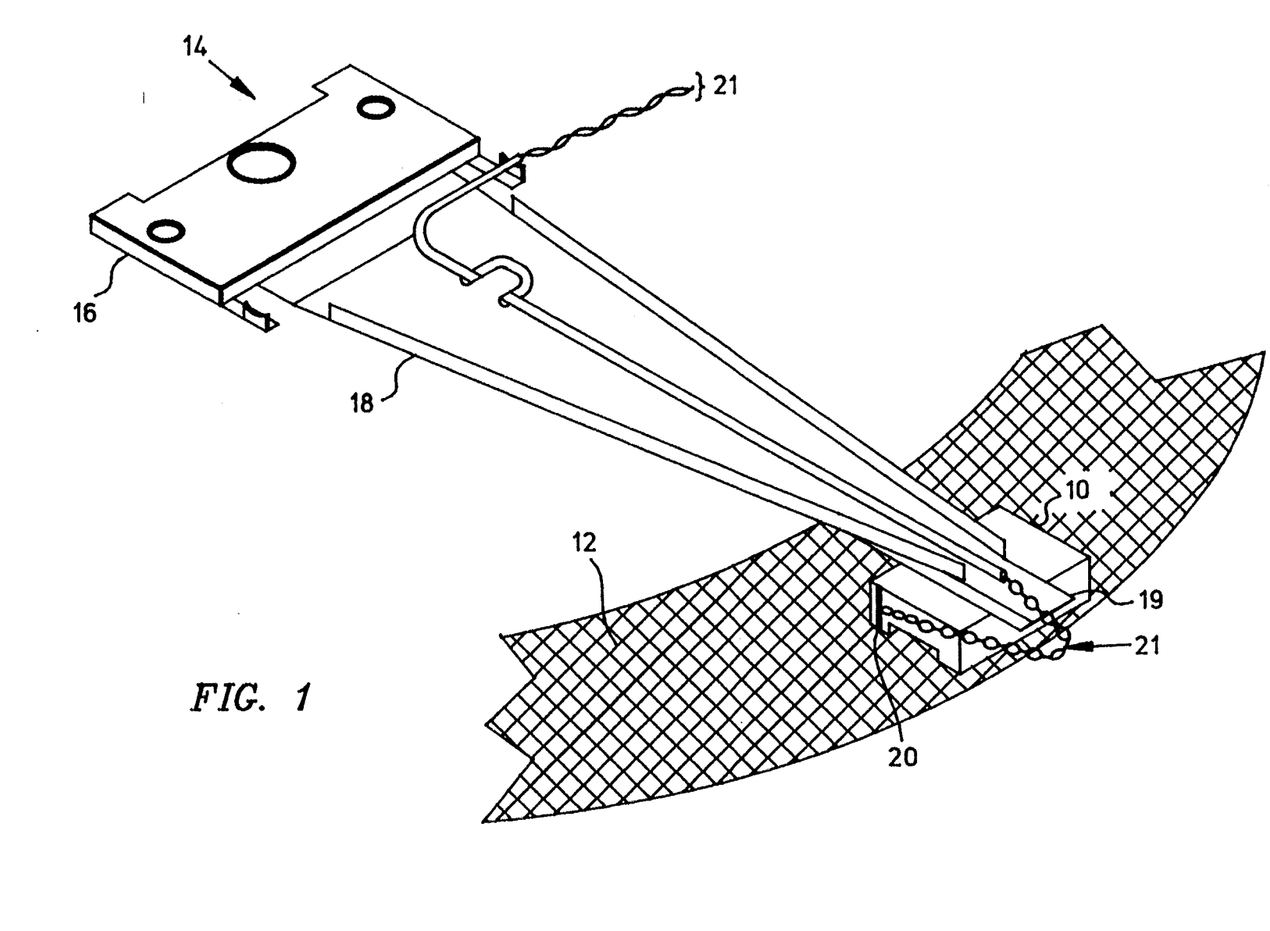
FIG. 1 is a perspective view illustrating the operational environment of the present invention in the context of a data storage drive mechanism.

FIG. 1 is a perspective view illustrating means for employing the present invention in a direct access storage device (DASD). In this regard, the invention concerns a slider 10 which is supported in a DASD with respect to a disk surface 12 by a slider suspension assembly 14 which includes a mount plate 16 and load beam 18. The slider 10 is attached to the load beam 18 by means of a flexure 19. A data read/write transducer 20 is mounted on the slider 10. One or more leads 21 connect the transducer 20 to DASD electronics.

Figure 2:
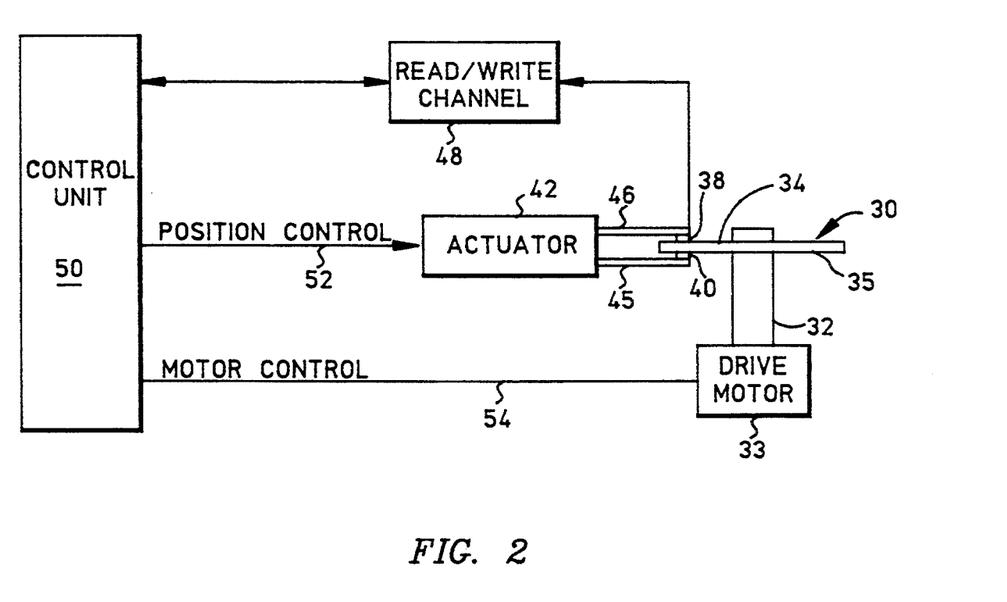
FIG. 2 is a block diagram illustrating the operational environment of the present invention in the context of a data storage drive mechanism.

FIG. 2 is a block diagram illustrating the essential complement of functional components in a DASD employing the slider design of this invention. Although FIG. 2 illustrates a single-disk device, it is to be understood that this is not intended to limit the practice of the invention to such devices. In fact, the invention is applicable as well to DASD's with multiple disks.

In FIG. 2 the disk 30 is mounted on a rotatable spindle 32 that is rotated by a drive motor 33. The disk 30 has an upper surface 34 and a lower surface 35. A slider 38 with a transducer mounted thereon faces the upper surface 34. Another slider 40 with a transducer mounted thereon faces the lower surface 35. The sliders 38 and 40 are positioned with respect to these surfaces 34 and 36 by respective movable slider arm assemblies 45 and 46. The arm assemblies are conventionally mounted to an actuator 42. The transducers on the sliders 38 and 40 are connected to conventional data channel electronics. In FIG. 2 read/write channel electronics 48 are shown only for the slider 38, it being understood that the transducer on the slider 40 is similarly supported in the DASD. A control unit 50, typically in the form of a processor, provides position control signals on a signal path 52 to the actuator 42. These signals control the positions of the slider 38 and 40 with respect to the surfaces of the disk 30. The control unit 50 provides motor speed control signals to control the rotational speed of the drive motor 33. The control unit 50 also processes read and write signals for the transducer on the slider 38 by way of the read/write channel electronics 48.

Each slider 38 and 40 may support one or more read/write transducers. As the disk 30 rotates, the sliders 38 and 40 are moved radially in and out over their respective disk surfaces so that the read/write transducers may access different portions of the disk 30 where desired data is recorded. Each slider 38 and 40 is attached to a respective actuator arm 45 and 46 by means of a suspension mechanism.

During operation of the DASD, rotation of the disk 30 generates a cushion of air (an "air bearing") between each of the sliders 38 and 40 and its respective disk surface. The air bearing exerts an upward force against a slider, which counterbalances an opposing disk-directed force exerted on the slider. The balance of forces supports a slider off of a disk by small, substantially constant spacing ("flying height") during operation. In negative-pressure sliders, the upward force is exerted against spaced-apart taper-flat slider rails; the opposing force is exerted by a recessed area on the slider surface between the rails which creates a suction acting between the slider and the disk surface. The balance between the forces results in a very slight positive load on the slider, while the rails provide a very stiff bearing.

The flying height of a slider is the distance between a particular point on a slider and the disk surface when the slider is supported on its cushion of air. Typically, the slider point coincides with a transducer location; usually, this location is at the trailing edge of the slider. It should also be noted that the terms "spacing" and "slider spacing" when used in the description and drawings are synonymous with flying height.

THE INVENTION

Figure 3A:
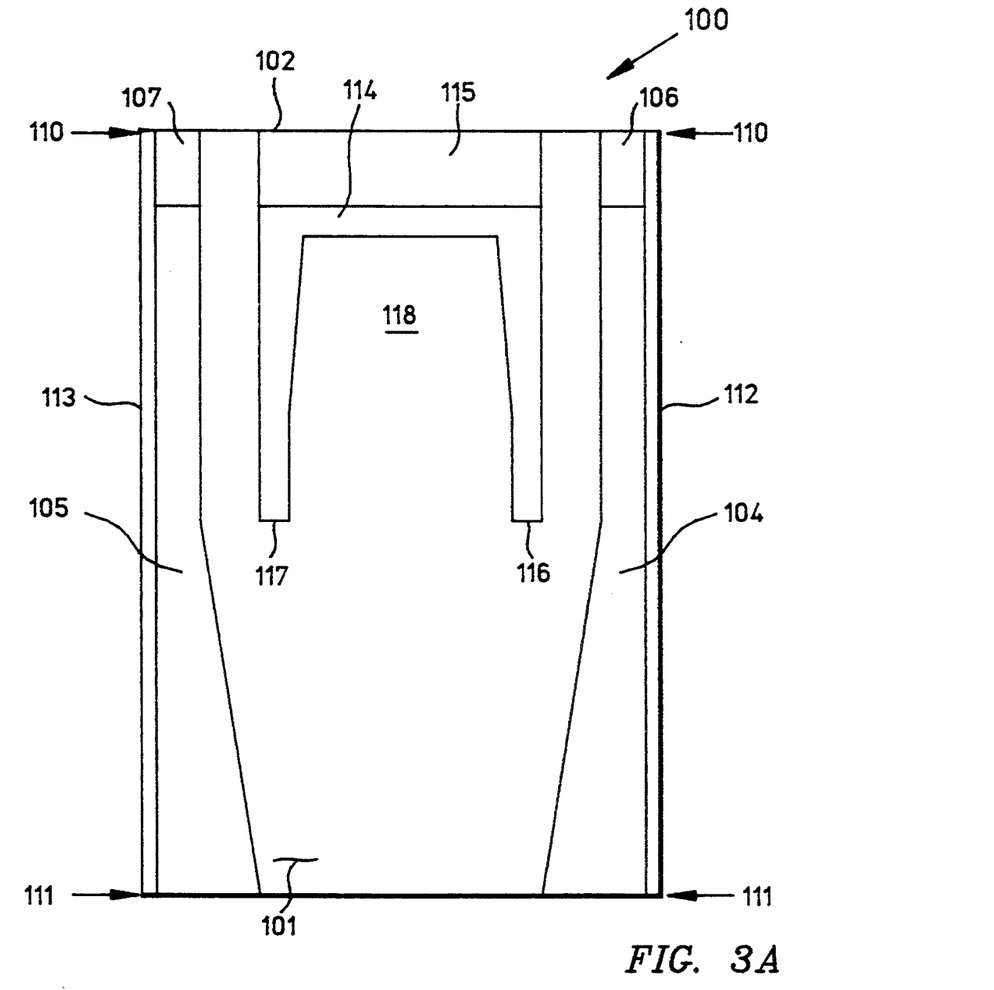
FIGS. 3A and 3B are bottom plan and rear elevation views, respectively, of a U-shaped rail air bearing slider structure according to a first embodiment of the present invention.
Figure 3B:
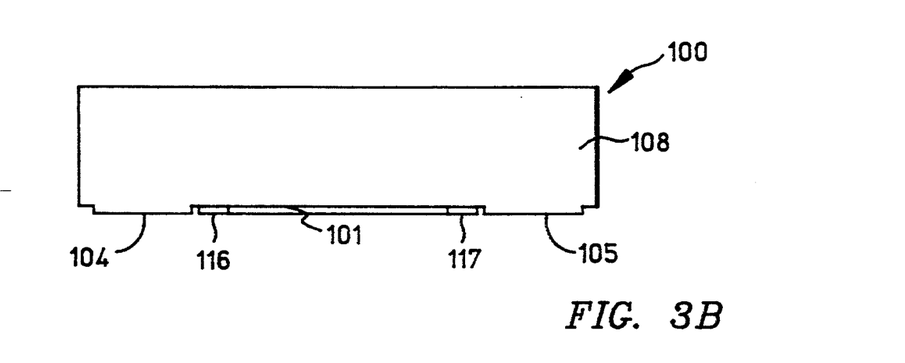

FIGS. 3A and 3B illustrate bottom plan and rear elevation views, respectively, of a U-shaped rail air bearing slider structure 100 in accordance with a first embodiment of the present invention. The slider structure 100 is designed to be used in a data storage device having a storage medium engaged in motion relative to the slider during data read/write operations. The slider structure includes a bottom surface 101 which, in the industrial environment, is positioned adjacent to and facing the data storage medium. The U-shaped rail 102 extends outwardly from the bottom surface 101 and is positioned between two outer taper-flat rails 104 and 105. The rails 104 and 105 include respective forward tapers 106 and 107. The slider structure 100 has a leading edge 110, a trailing edge 111, and respective side edges 112 and 113. The U-shaped rail 102 includes a cross rail portion 114 which transitions to a forward tapered section 115. As shown in FIG. 3A, the cross rail portion 114 extends laterally across less than the full width of the slider structure 100 between the side rails 104 and 105. The U-shaped rail 102 also includes a pair of side rails 116 and 117 which are substantially parallel with the forward sections of the side rails 104 and 105 and which join the cross rail portion 114 to form a three-sided enclosure enclosing an area 118 on the slider bottom surface 101.

During operation, when the slider structure is supported on an air bearing, a negative pressure is generated in the area 118 enclosed on three sides by the U-shaped rail 102. The amount of negative air pressure generated by the slider structure 100 is controlled by the length and width of the area 118.

The two outer taper-flat rails 104 and 105 are each situated substantially adjacent to a respective side edge. These rails provide roll stiffness and may be extended to the rear surface 108 to provide a mounting location for read/write transducers. As FIG. 3A illustrates, the rails 104 and 105 have substantially constant widths from the leading edge 110 to the tips of the rails 116 and 117. From there to the trailing edge 111, the widths of the pads 104 and 105 increase constantly.

As shown in FIG. 3A (and in the embodiments illustrated in FIGS. 4A, 5A and 6A), the U-shaped rail is formed on the bottom surface of the slider at a location which is centered between, but separated from the side rails. This structure characterizes the first through the fourth embodiments of the invention.

Figure 4A:
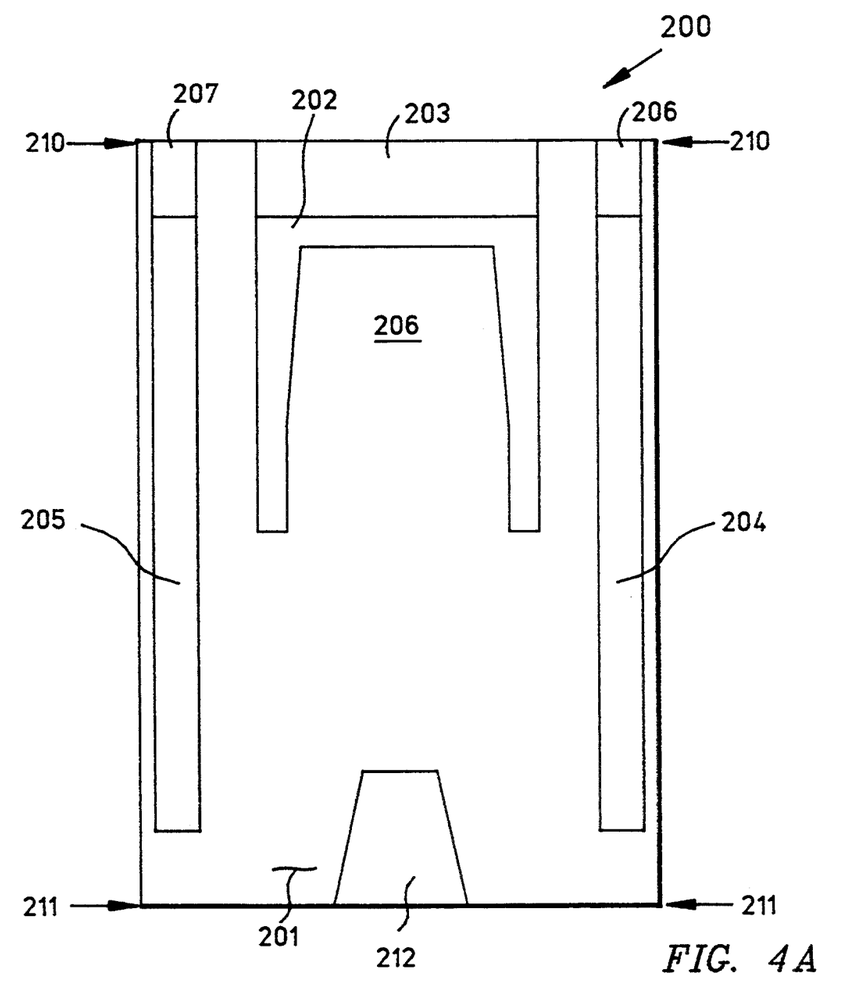
FIGS. 4A and 4B are bottom plan and rear elevation views, respectively, of a U-shaped rail air bearing slider structure according to a second embodiment of the present invention which includes an isolated island positioned between the side pads of the U-shaped rail.
Figure 4B:
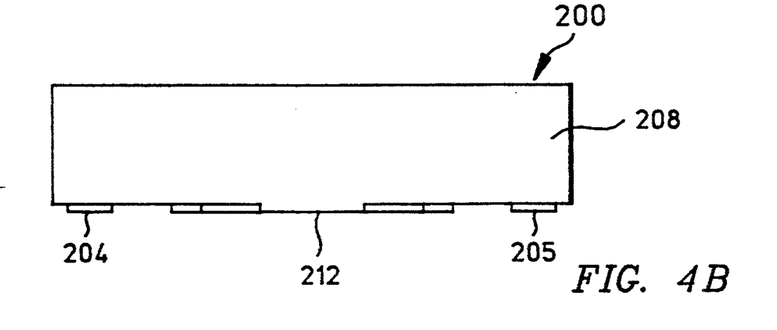

FIGS. 4A and 4B are bottom plan and rear elevation views, respectively, of a U-shaped rail air bearing slider structure 200 in accordance with a second embodiment of the invention. The slider structure 200 corresponds essentially to the slider structure 100 of FIGS. 3A and 3B in having a U-shaped rail 202 with a forward taper 203 that extends outwardly from the bottom surface 201 and is centered laterally between two outer taper-flat rails 204 and 205 with forward tapers 206 and 207, respectively. Unlike the taper-flat rails 104 and 105 of FIG. 3A, the taper-flat rails 204 and 205 in FIG. 4A exhibit a continuous width. However, the outer taper-flat rails 204 and 205 do not extend along the full length of the bottom surface 201 from leading edge 210 to trailing edge 211. Rather, the rails 204 and 205 are offset from the trailing edge 211 to eliminate roll sensitivity. An isolated island 212 is provided on the bottom surface 201 at a position which abuts the trailing edge 211 and is centered between the legs of the U-shaped rail 202. This island provides a site at which a data read/write transducer is mounted.

Figure 5A:
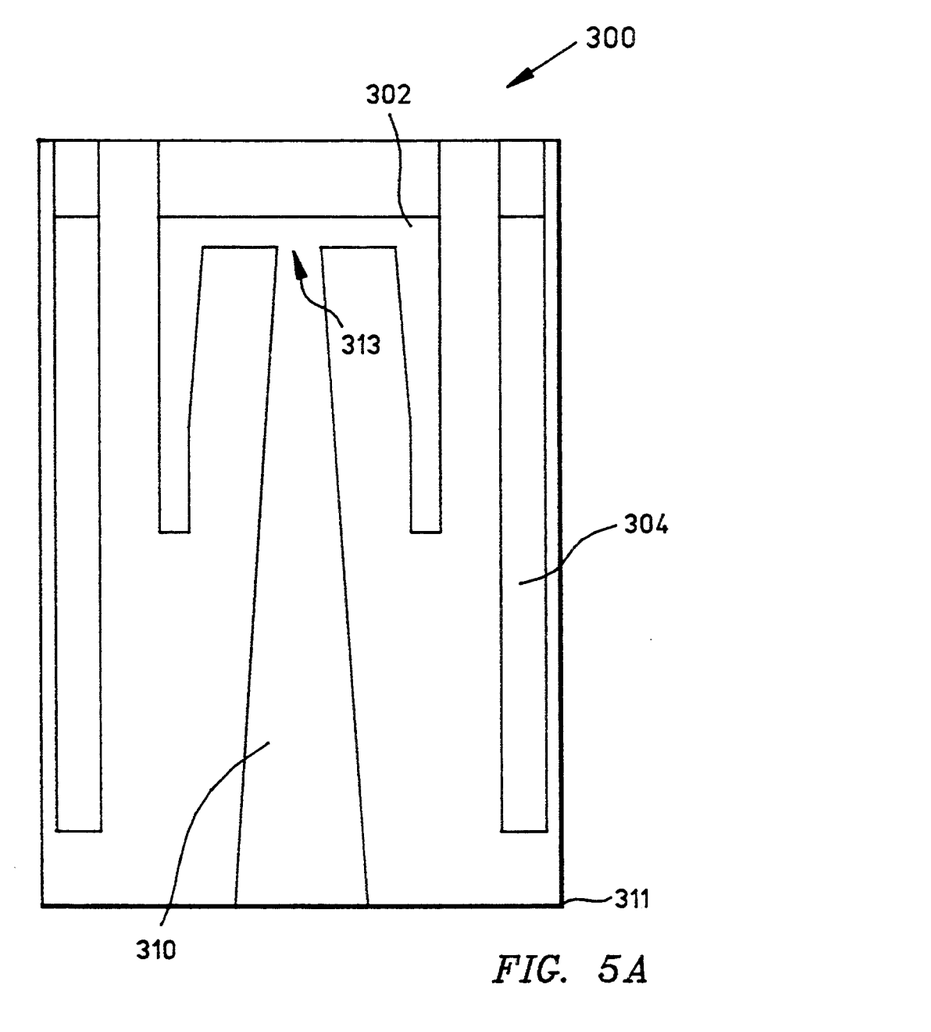
FIGS. 5A and 5B are bottom plan and rear elevation views, respectively, of a U-shaped rail air bearing slider structure according to a third embodiment of the present invention which includes load bearing means and a center rail attached to the U-shaped rail.
Figure 5B:
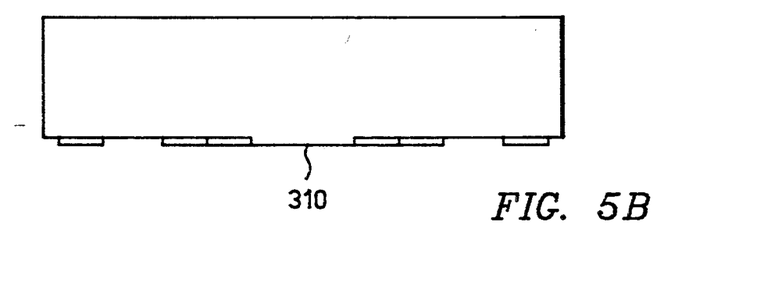

FIGS. 5A and 5B illustrate bottom plan and rear elevation views, respectively, of a U-shaped rail air bearing slider structure 300 in accordance with the third embodiment Of the present invention. The slider structure 300 is essentially identical with the slider structure 200 illustrated in FIGS. 4A and 4B with exception that it does not include an isolated island. Rather, the slider structure in FIGS. 5A and 5B includes a center rail 310 which is adapted to carry a data read/write transducer at the trailing edge 311. The center rail 310 extends from the vertex 313 of the U-shaped rail 302 to the trailing edge 311 of the slider structure 300. The width of the center rail 310 increases continuously from the vertex 313 to the trailing edge 311.

Figure 6A:
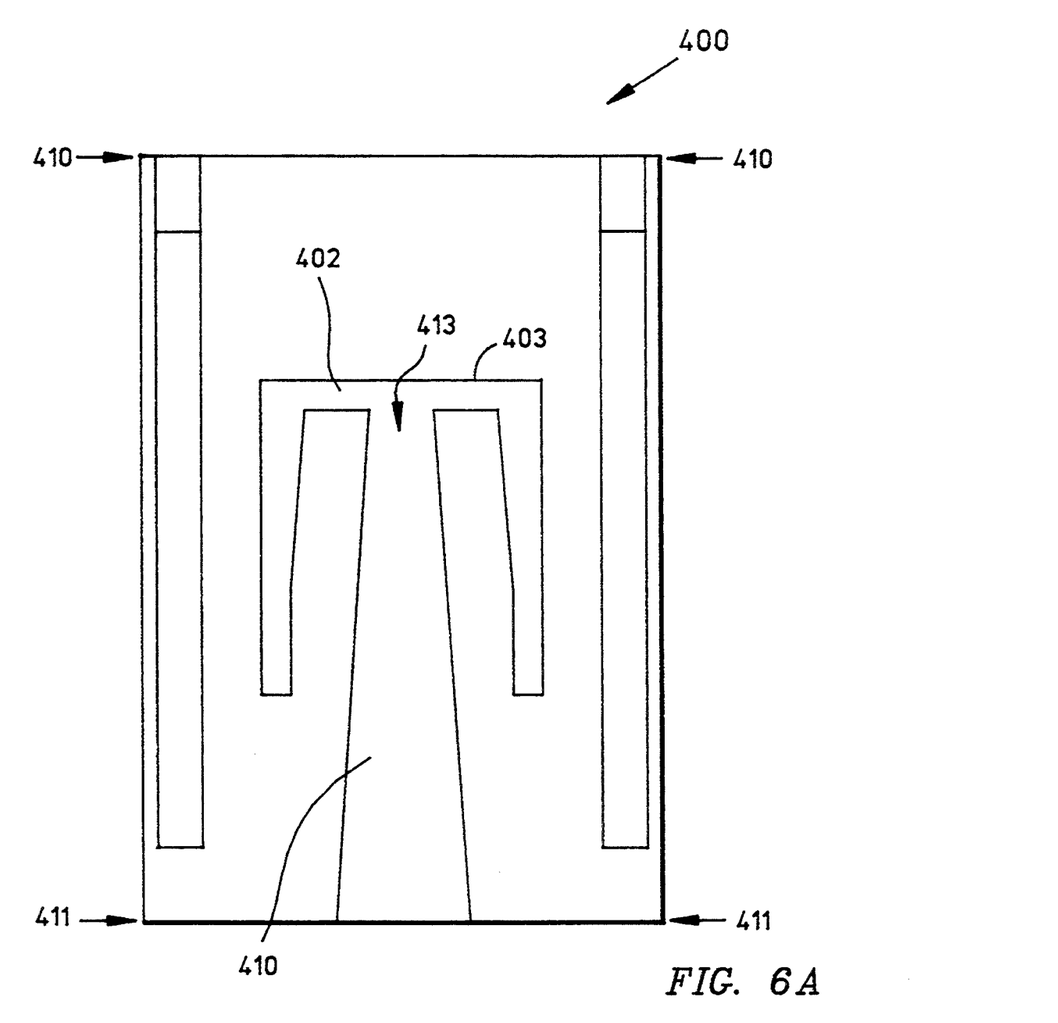
FIGS. 6A and 6B are bottom plan and rear elevation views, respectively, of a U-shaped rail air bearing slider structure according to a fourth embodiment of the present invention in which a curved portion of the U-shaped rail is positioned near the center of the first surface of the slider structure.
Figure 6B:
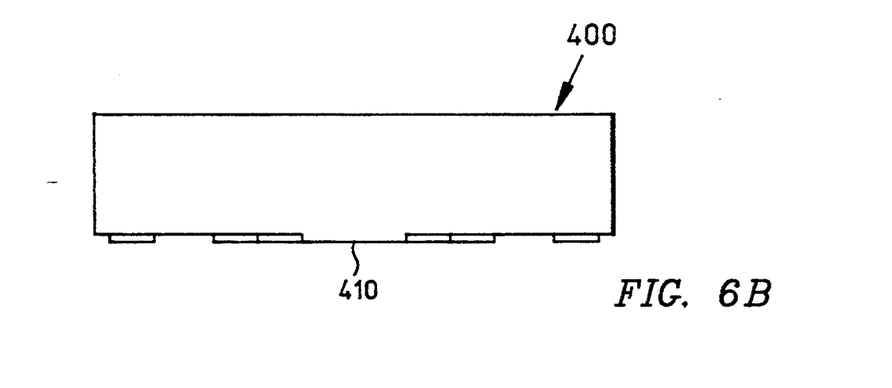

FIGS. 6A and 6B illustrate bottom plan and rear elevation views, respectively, of a U-shaped rail air bearing slider structure 400 in accordance with a fourth embodiment of the present invention. The slider structure 400 corresponds essentially to the slider structure 300 of FIGS. 5A and 5B. In this regard, the slider structure 400 includes on its bottom surface 401 a U-shaped rail 402, However, the rail 402 includes an untapered forward edge 403 and is offset from the leading edge 410 of the slider structure in the direction of the trailing edge 411. This slider structure includes a center rail 410 which extends, with a constantly-increasing width, from the vertex 413 of the U-shaped rail 402 to the trailing edge 411. Positioning the U-shaped rail 402 in this manner provides a slider structure having desirable pitch angle and flying height properties.

Figure 7A:
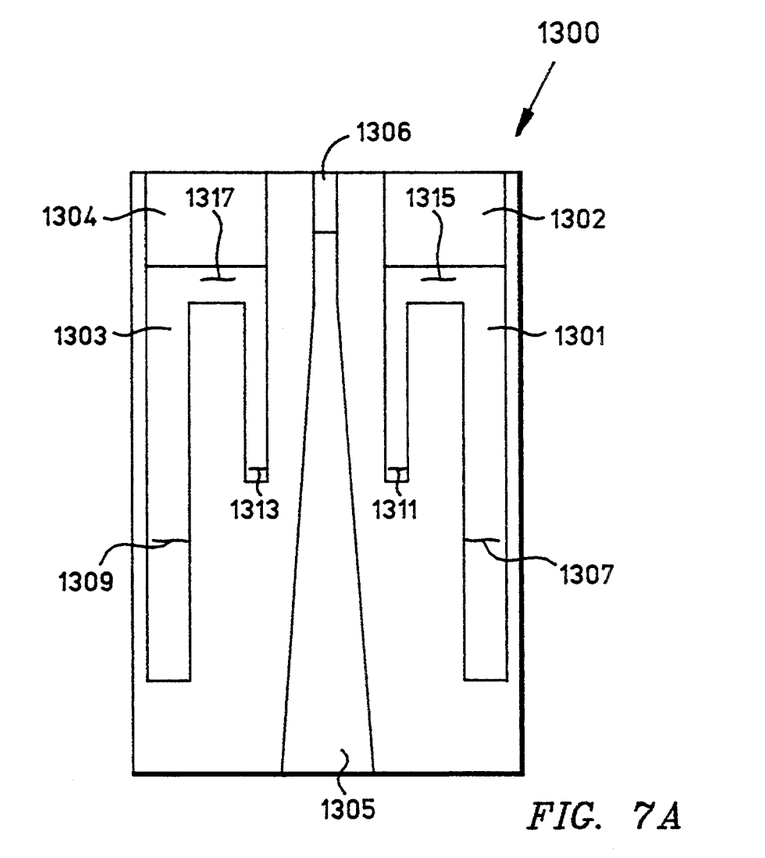
FIGS. 7A-7B are bottom plan and rear elevation views, respectively, of an alternate embodiment of the slider structure of the present invention which employs two U-shaped rails separated by a center rail.
Figure 7B:
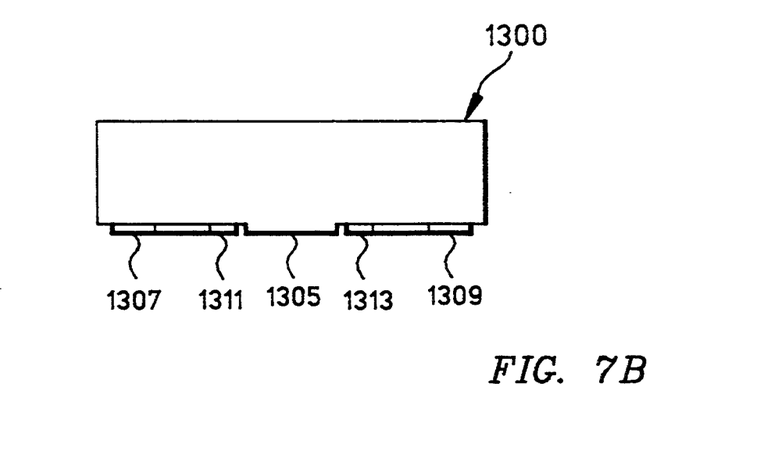

FIGS. 7A and 7B are bottom plan and rear elevation views, respectively, of an alternate embodiment of the slider structure of the present invention which employs two U-shaped rails separated by a center rail. In this alternate embodiment, the slider structure 1300 has two U-shaped rails 1301 and 1303 separated by a center rail 1305. Rails 1301 and 1303 include forward tapered sections 1302 and 1304, respectively. The center rail 1305 includes a forward tapered section 1306. The U-shaped rail 1301 includes outer and inner rails 1307 and 1311, respectively, while the rail 1303 includes outer and inner rails 1309 and 1313, respectively. Although the outer rails 1307 and 1309 are illustrated as being longer and wider than the inner rails 1311 and 1313, the relative dimensions of length and width may be varied according to design requirements. The outer rails are positioned adjacent respective side edges of the slider to provide roll stiffness and to maintain the slider structure in a relatively high pitch angle. The length of the inner rails 1311 and 1313 and the width of the U-shaped rails 1301 and 1303 at the rail vertices 1315 and 1317, respectively, may be optimized for specific values of negative loading. Each of the U-shaped rails 1301 and 1303 may be altered independently, allowing slider 1300 to be optimized for specific roll conditions and/or rotary skew environments.

Figure 8A:
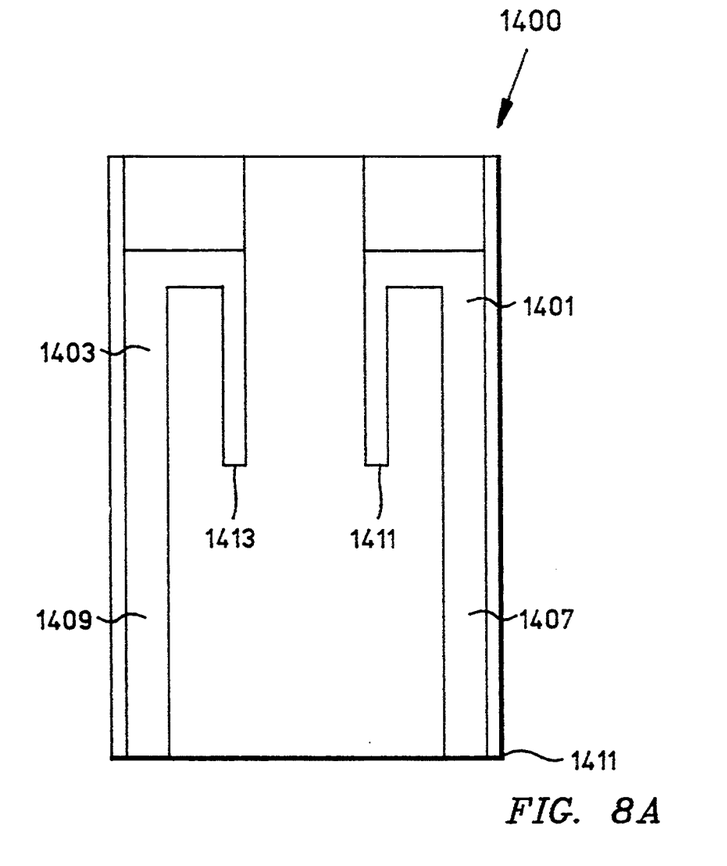
FIGS. 8A and 8B are bottom plan and rear elevation views, respectively, of a slider structure similar to that of FIGS. 7A and 7B, but wherein outside rails have been adapted to support a read/write element.
Figure 8B:
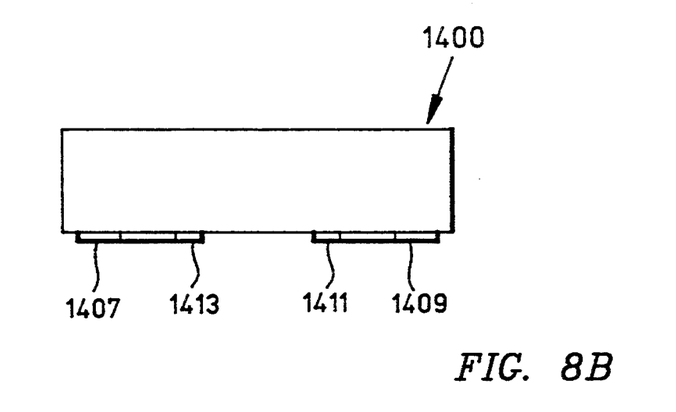

FIGS. 8A and 8B illustrate bottom plan and rear elevations views, respectively, of a U-shaped rail air bearing slider structure 1400 which is essentially equivalent to the slider structure 1300 of FIGS. 7A and 7B. In this regard, the slider 1400 includes two U-shaped rails 1401 and 1404, respectively. The U-shaped rail 1401 includes an outer rail 1407 adjacent a first side edge of the slider, which extends to the trailing edge 1411 of the slider 1400 and a shorter inner rail 1411. Similarly, the U-shaped rail 1403 includes an outer rail 1409 adjacent a second side edge of the slider and extending to the trailing edge 1411, and a relatively shorter inner rail 1413. The extension of the outer rails 1407 and 1409 to the trailing edge 1411 adapts them for supporting data read/write elements. This eliminates the need for a center rail in the slider structure 1400.

Figure 9A:
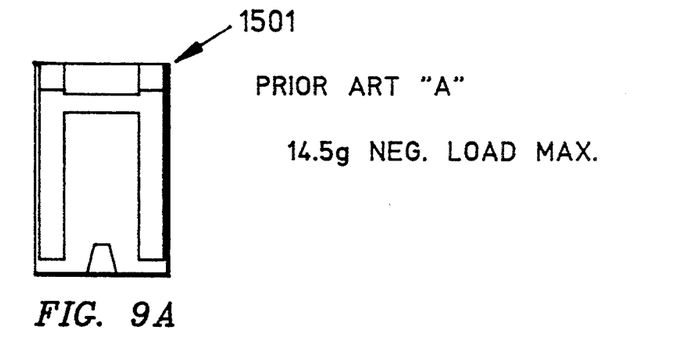
FIGS. 9A-9D illustrate bottom plan views of various prior-art slider configurations and a U-shaped rail air bearing slider according to the invention.
Figure 9B:
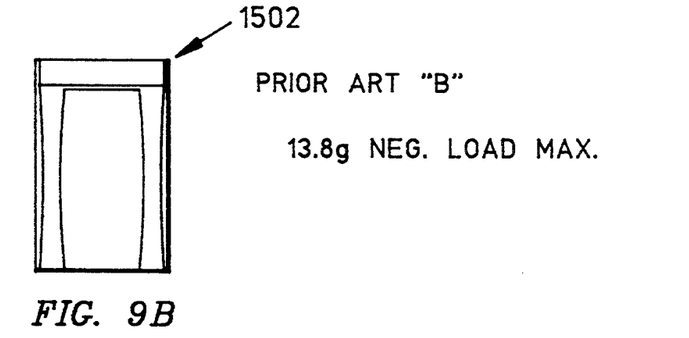
Figure 9C:
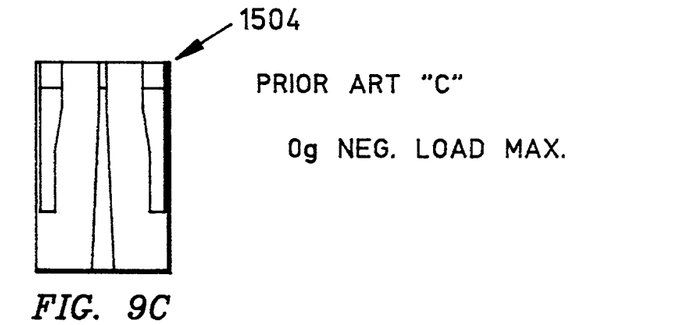
Figure 9D:
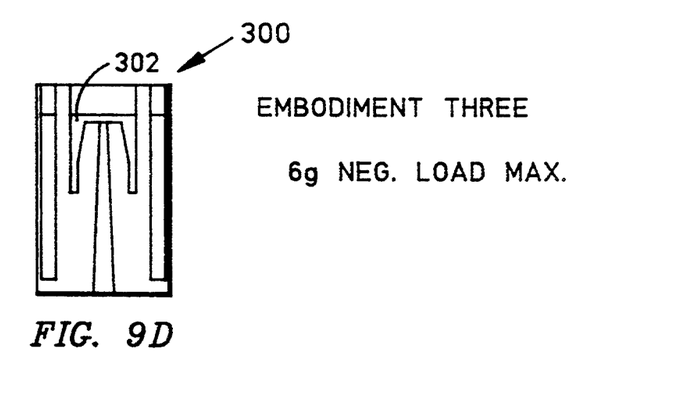

FIGS. 9A–9D illustrate plan views for several air bearing slider structures, including various prior-art slider structures and a U-shaped air bearing rail structure according to the present invention. The slider structure of the third embodiment of the invention is illustrated in FIG. 9D. This slider structure 300 is identical to the structure shown in FIG. 5, and may hereinafter be referred to as the "Embodiment three" slider 300.

FIGS. 9A and 9B show prior-art negative-pressure slider structures, referred to as the Prior Art "A" slider 1501, and the Prior Art "B" slider 1502, respectively. The Prior Art "A" slider 1501 and the Prior Art "B" slider 1502 are less advantageous than the Embodiment three slider 300 shown in FIG. 9D. FIG. 9C illustrates a slider structure of the prior art, which is very similar to the positively loaded tri-rail, taper-flat structure commonly in use in presently-existing data storage drives. This prior-art slider structure is included in the present analysis for purposes of comparison only, and may be referred to as the Prior Art "C" slider 1504.

Figure 10:
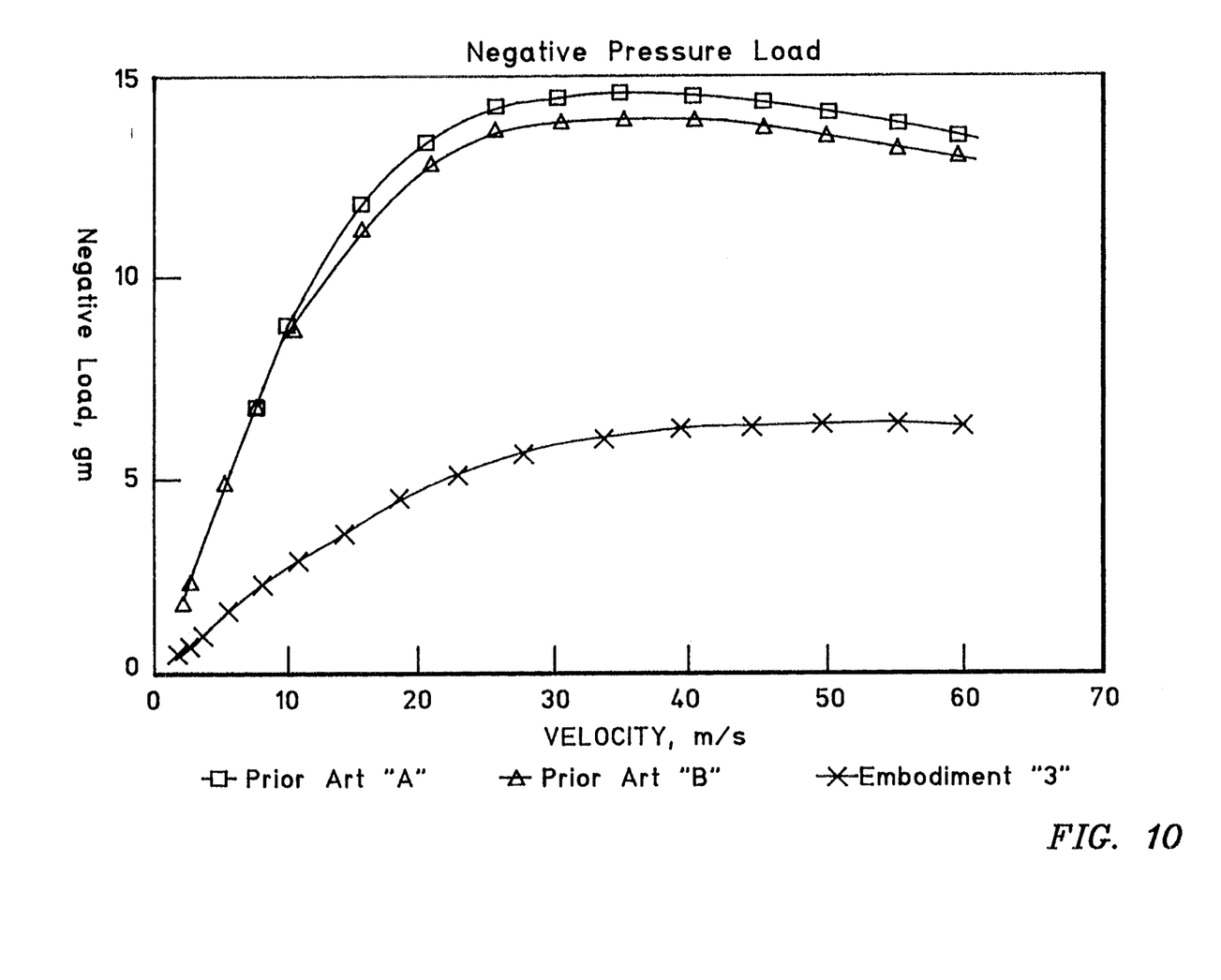
FIG. 10 graphically illustrates the magnitude of negative air pressure versus velocity for the slider structures shown in FIGS. 9A, 9B and 9D.

FIG. 10 is a graph showing negative loading versus velocity for the Embodiment three slider 300, the Prior Art "A" slider 1501, and the Prior Art "B" slider 1502. The test conditions reproduced conditions of the industrial environment illustrated in FIG. 1. In this regard, each slider was mounted to a suspension assembly and maintained thereby over a rotating disk. Standard modelling techniques were used to determine the negative loading produced by each slider in response to disk velocity. Referring to the graph of FIG. 10, the Embodiment three slider 300 exhibits relatively low negative loading as compared to the prior art slider designs. The Embodiment three slider 300 also exhibits adjustable negative pressure independent of flying height and rail etching depth. The design has relatively low sensitivity to fabrication tolerances and low sensitivity to data accessing skew. Improved damping is provided, as well as relatively fast take-off from the data storage medium surface.

Figure 11:
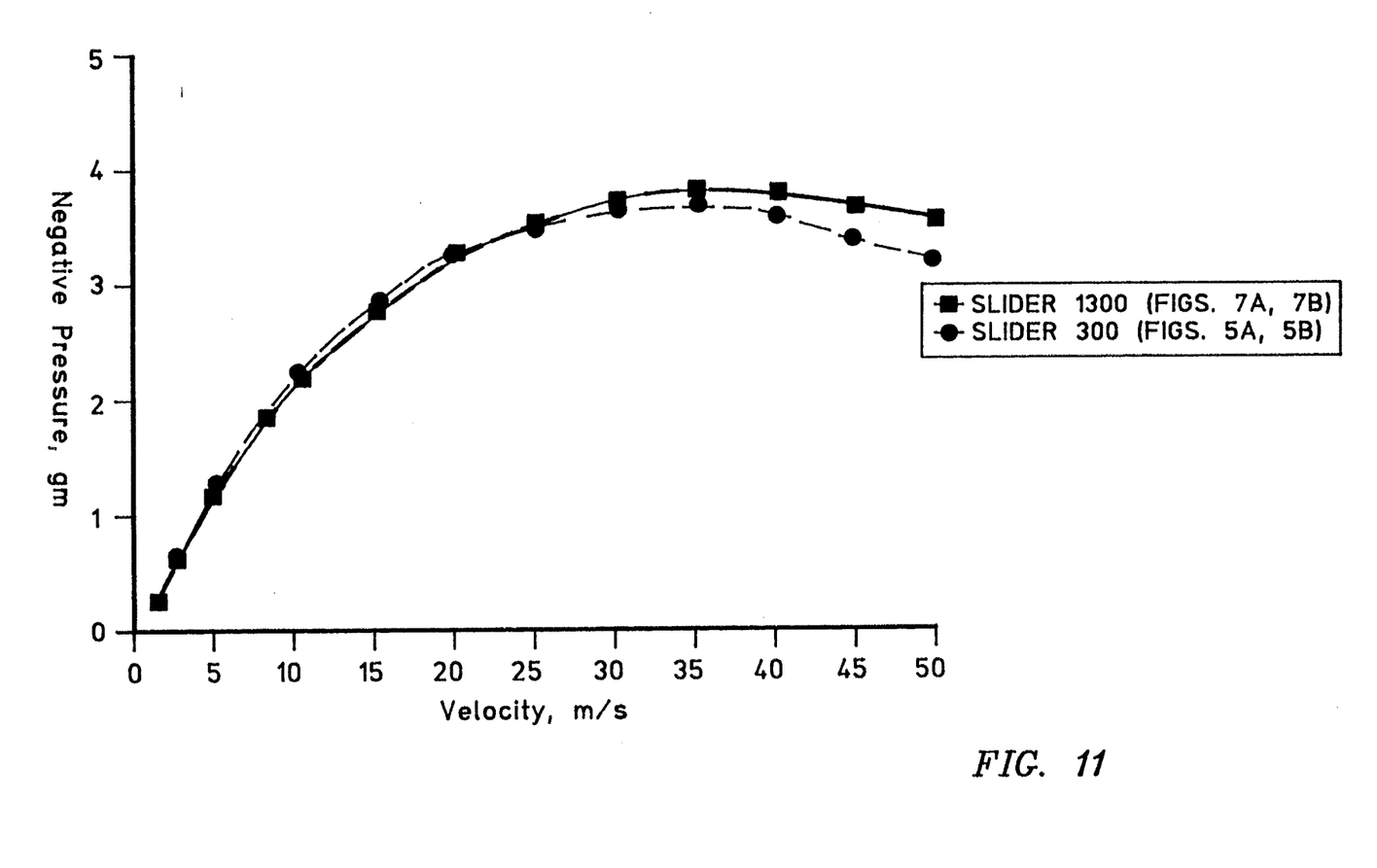
FIG. 11 graphically illustrates the magnitude of negative air pressure versus velocity for two slider structures according to the invention.
Figure 12:
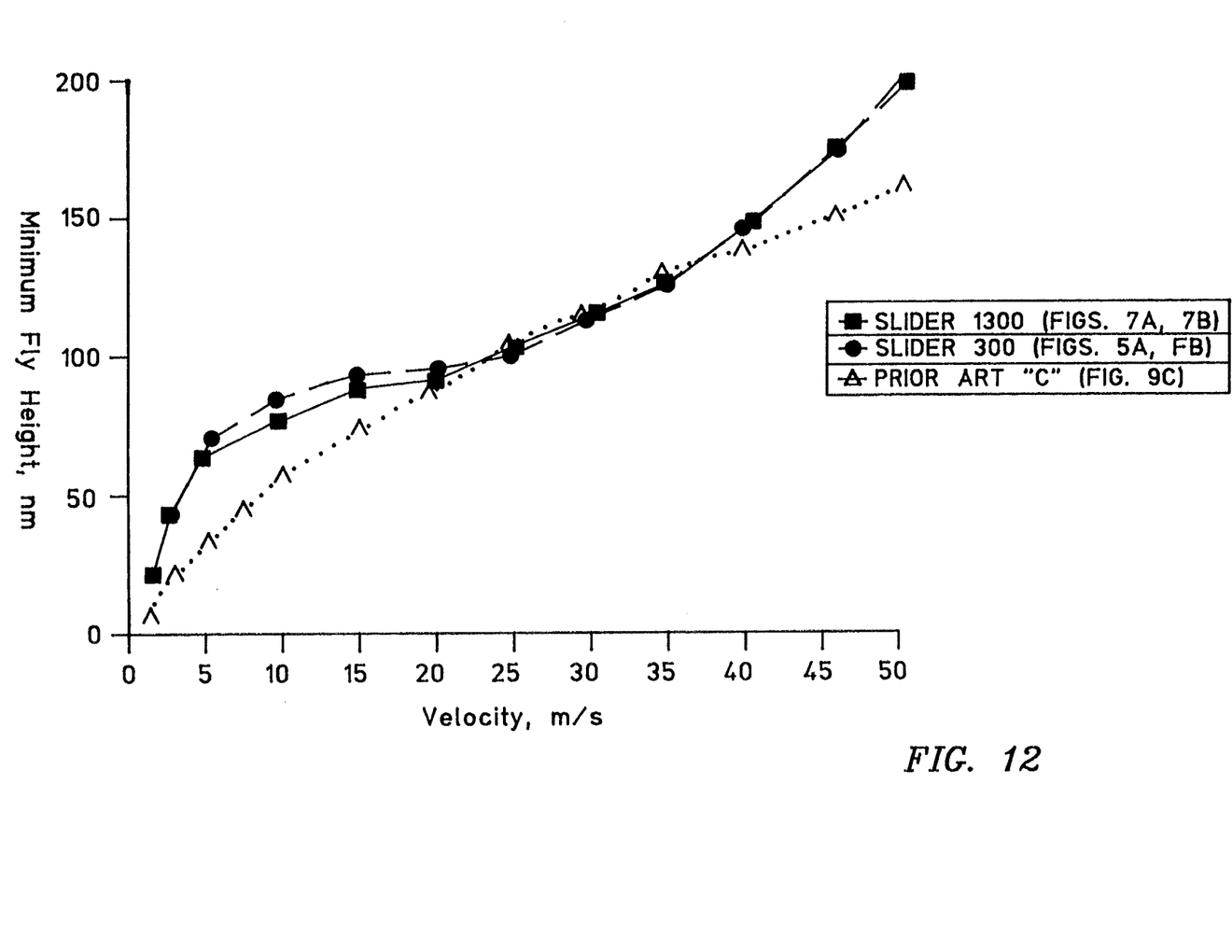
FIG. 12 graphically illustrates velocity versus flying height for the slider structures shown in FIGS. 5A and 5B, 7A and 7B, and 9C.

FIGS. 11 and 12 provide graphical comparisons between the operation of the alternative embodiment slider 1300 and the Embodiment three slider 300. The comparison of FIG. 12 also considers the performance of a conventional Prior Art "C" slider 1504 (FIG. 9C).

The comparisons illustrated in FIGS. 11 and 12 were conducted using small sliders which measured 1.6 mm in width ×2.5 mm in length. The resulting bottom surface area of the slider 1300 was 12% less than the slider 300 with the consequence that the slider 1300 provided improved stationary friction properties. Both the slider 1300 and the slider 300 utilized suspension loads of approximately 1 to 2 grams, which was four times less than the suspension load needed for the Prior Art "C" slider 1504. This reduction in suspension loads leads to superior start/stop performance and further reduces stiction.

The graph of FIG. 11 illustrate the low negative pressure achievable for two negative-pressure slider designs of the invention; namely, the slider 1300 and the slider 300.

The graph of FIG. 12 shows minimum flying height versus velocity for the Prior Art "C" slider 1504, the slider 300, and the slider 1300. The slider 1300 of the present invention takes off just as fast from the data storage medium surface as the slider 300, and much faster than the control Prior Art "C" slider 1504. The high take-off velocity is a characteristic shared by negative-pressure slider designs.

With reference to FIGS. 7A–7B, 11 and 12, the slider 1300 has advantages over presently-existing air bearing slider designs. The slider 1300 generates low negative pressure independent of etch depth and flying height. This slider also exhibits reduced sensitivity to manufacturing tolerances, and improved performance during the data storage medium access operations. Furthermore, the slider features rapid take-off from the surface of the data storage medium.

A number of specific embodiments of the present invention have been described. Nevertheless, it will be understood that various modifications and changes may be made without departing from the spirit and scope of the invention. Accordingly, it is to be understood that the invention is not to be limited by the specific illustrated embodiments, but only by the scope of the appended claims.

We claim:

1. A slider for supporting a transducer in relation to a moving data storage medium, comprising:
    a slider structure with a leading edge, a trailing edge, and first and second side edges;
    a bottom surface adjoining said leading, trailing and side edges;
    a first U-shaped rail projecting outwardly from said bottom surface, said first U-shaped rail including:
        a cross rail substantially parallel to said leading edge and extending across less than one-half a width of said bottom surface;
        the cross rail having a tapered portion which is adjacent said leading edge of the slider;
        a first side rail substantially perpendicular to and adjoining said cross rail, said first side rail substantially adjacent and parallel to the first side edge and extending from said cross rail towards said trailing edge;
        a second side rail, substantially parallel to said first side rail and offset from said first side rail toward the center of said bottom surface; and
        the second side rail being narrower and shorter than the first side rail; and
    a second U-shaped rail projecting outwardly from said bottom surface, said second U-shaped rail including:
        a cross rail substantially parallel to said leading edge and extending across less than one-half a width of said bottom surface;
        the cross rail having a tapered portion which is adjacent said leading edge of the slider;
        a first side rail substantially perpendicular to and adjoining said cross rail, said first side rail substantially adjacent and parallel to the first side edge and extending from said cross rail towards said trailing edge;
        a second side rail, substantially parallel to said first side rail and offset from said first side rail toward the center of said bottom surface; and
        the second side rail being narrower and shorter than the first side rail; and the cross rail and the first and second side rails of the first and second U-shaped rails having surfaces which lie in a common plane.

2. A data storage drive including the slider of claim 21, the drive comprising:
    the movable data storage medium;
    means for moving the movable data storage medium; and
    means for supporting the slider adjacent the movable data storage medium.

* * * * *

UNITED STATES PATENT AND TRADEMARK OFFICE
CERTIFICATE OF CORRECTION

PATENT NO. : 5,438,467
DATED : August 1, 1995
INVENTOR(S) : Dorius et al

It is certified that error appears in the above-indentified patent and that said Letters Patent is hereby corrected as shown below:

Col. 8, line 37, "the cross ... which lie in a common plane." should be a separate paragraph commencing fully to the left.

Col. 8, line 42, change "21" to --1--.

Signed and Sealed this

Sixth Day of February, 1996

BRUCE LEHMAN

Attest:

Attesting Officer

Commissioner of Patents and Trademarks